(12) United States Patent
Mathey et al.

(10) Patent No.: US 11,879,389 B2
(45) Date of Patent: Jan. 23, 2024

(54) CONCENTRIC INTRODUCTION OF THE WASTE-GATE MASS FLOW INTO A FLOW-OPTIMIZED AXIAL DIFFUSOR

(71) Applicant: Turbo Systems Switzerland Ltd., Baden (CH)

(72) Inventors: Christoph Mathey, Fislisbach (CH); Stephan Senn, Remigen (CH)

(73) Assignee: Turbo Systems Switzerland Ltd., Baden (CH)

( * ) Notice: Subject to any disclaimer, the term of this patent is extended or adjusted under 35 U.S.C. 154(b) by 0 days.

(21) Appl. No.: 17/641,357

(22) PCT Filed: Sep. 9, 2020

(86) PCT No.: PCT/EP2020/074471
§ 371 (c)(1),
(2) Date: Mar. 8, 2022

(87) PCT Pub. No.: WO2021/052759
PCT Pub. Date: Mar. 25, 2021

(65) Prior Publication Data
US 2023/0358167 A1  Nov. 9, 2023

(30) Foreign Application Priority Data
Sep. 18, 2019 (EP) .................... 19198053

(51) Int. Cl.
*F02C 6/12* (2006.01)
*F01D 25/30* (2006.01)
*F02C 6/02* (2006.01)

(52) U.S. Cl.
CPC ............... *F02C 6/02* (2013.01); *F01D 25/30* (2013.01); *F05D 2220/40* (2013.01)

(58) Field of Classification Search
CPC ... F02C 6/12; F01D 25/30; F01D 5/00; F01D 5/02; F01D 5/12; F05D 2220/40;
(Continued)

(56) References Cited

U.S. PATENT DOCUMENTS 5,857,337 A * 1/1999 Kawasaki ............. F02B 37/183
60/602
6,648,594 B1 * 11/2003 Horner ................ F04D 27/0207
415/206

(Continued)

FOREIGN PATENT DOCUMENTS

DE        3101131 A1    8/1982
DE    102017121337 A1    3/2019
(Continued)

OTHER PUBLICATIONS

Written Opinion for International Application No. PCT/EP2020/074471, dated Oct. 15, 2020, 4 pages.

*Primary Examiner* — Mark A Laurenzi
*Assistant Examiner* — Dapinder Singh
(74) *Attorney, Agent, or Firm* — Armstrong Teasdale LLP

(57) ABSTRACT

An exhaust turbine includes a turbine wheel having a plurality of rotor blades, an exhaust outlet where the exhaust outlet is arranged downstream of the rotor blades and is delimited radial to the outside by an axial turbine diffusor. An exhaust mass flow can be output in an axial flow direction by the exhaust outlet duct and the axial turbine diffusor opens downstream, radially to the outside at a non-constant diffusor-opening angle, such that at a first diffusor-opening angle deviates from a second diffusor-opening angle by at least 1°. The exhaust turbine further includes a waste gate duct, the outlet region of which opens into the diffusor or directly downstream of the diffusor into the exhaust outlet duct. The waste gate duct is designed to (Continued)

generate a substantially axial flow direction of a waste gate mass flow at the outlet region of the waste gate duct.

13 Claims, 3 Drawing Sheets

(58) Field of Classification Search
CPC ...... F05D 2240/12; F02B 39/00; F02B 37/24; F02B 37/025; F05B 2220/40
See application file for complete search history.

(56) References Cited

U.S. PATENT DOCUMENTS

| | | |
|---|---|---|
| 9,447,753 B2 * | 9/2016 | Kuribayashi ......... F02B 37/183 |
| 9,689,397 B2 * | 6/2017 | Edwards ............... F01D 17/105 |
| 9,739,166 B1 | 8/2017 | King et al. |
| 11,073,048 B2 | 7/2021 | Senn et al. |
| 2014/0000256 A1 * | 1/2014 | Hirth ...................... F02M 26/00 |
| | | 60/605.2 |
| 2019/0170059 A1 * | 6/2019 | Jin ........................ F01D 17/105 |

FOREIGN PATENT DOCUMENTS

| | | |
|---|---|---|
| EP | 3358148 A2 | 8/2018 |
| JP | S5535383 U | 3/1980 |
| WO | 2011002732 A2 | 1/2011 |

* cited by examiner

CONCENTRIC INTRODUCTION OF THE WASTE-GATE MASS FLOW INTO A FLOW-OPTIMIZED AXIAL DIFFUSOR

CROSS-REFERENCE TO RELATED APPLICATION

This application is a National State Entry of PCT/EP2020/074471, filed Sep. 2, 2020, titled "CONCENTRIC INTRODUCTION OF THE WASTE-GATE MASS FLOW INTO A FLOW-OPTIMIZED AXIAL DIFFUSOR" and which claims priority to EP Application No. 19198053.1, filed Sep. 18, 2019, which are hereby incorporated by reference in their entirety.

BACKGROUND

This disclosure relates to the field of exhaust turbochargers for pressure-charged internal combustion engines. In particular, the disclosure relates to an exhaust turbine having a flow-optimized axial diffusor, of the kind that can be used in exhaust turbochargers and also in gas turbines and power turbines.

Exhaust turbochargers are nowadays used as standard for increasing the power of internal combustion engines, having a turbine in the exhaust tract of the internal combustion engine and having a compressor upstream of the internal combustion engine. Here, the exhaust gases of the internal combustion engine are expanded in the turbine. The work thus obtained is transferred by means of a shaft to the compressor, which compresses the air fed to the internal combustion engine. By using the energy of the exhaust gases to compress the air fed to the combustion process in the internal combustion engine, it is possible to optimize the combustion process and the efficiency of the internal combustion engine.

In the case of exhaust turbines of exhaust turbochargers known from the prior art, the pressure recovery at the exhaust turbine outlet is typically achieved by means of diffusors, which can be of annular and of right conical design, for example. Furthermore, a non-rotating, conical component is typically attached to the hub of the turbine wheel in order to improve pressure recovery.

It has been found that pressure recovery is still in need of improvement in the case of such exhaust turbine diffusors known from the prior art. Furthermore, it has been found that the conventional diffusors have certain disadvantages with regard to complexity, installation space and costs.

DE 10 2017 121 337 A1 discloses an exhaust turbine which includes a turbine wheel having a multiplicity of rotor blades, an exhaust outlet duct, which is arranged downstream of the rotor blades of the turbine wheel and which is delimited radially on the outside by an axial turbine diffusor and radially on the inside, at least partially, by a spinner. In this case, the axial turbine diffusor and the spinner are each formed from a number of successive conical diffusor segments.

EP 3 358 148 A2 discloses an exhaust turbine which has a turbine wheel, an exhaust outlet duct, a diffusor which is arranged downstream of the turbine wheel, delimits the exhaust outlet duct radially on the outside and opens radially outward, and a waste gate duct, the outlet region of which opens into the exhaust outlet duct.

U.S. Pat. No. 9,739,166 B1 discloses an exhaust turbine in which a waste-gate mass flow is injected at a small angle directly into the exhaust outlet duct of the turbine.

JP S55 35383 U discloses an exhaust turbine in which a waste-gate mass flow is injected at a small angle or in parallel directly into the exhaust outlet duct of the turbine.

DE 31 01 131 A1 discloses an exhaust turbine in which a waste-gate mass flow is injected into the exhaust outlet duct of the turbine at an angle of less than 10°.

Nowadays, internal combustion engines, in particular large engines, are increasingly being equipped with quasi-constant-pressure-like exhaust-gas collectors of single-tube design. In conjunction with exhaust turbochargers, these exhaust-gas collectors require the use of turbocharger turbines which are as small as possible in order to ensure thermally controllable operation at partial load and in the event of load application or acceleration. However, small turbocharger turbines can lead to inadmissibly high boost pressures in upper load operation and at full load, which can lead to lasting damage to the turbocharger and the basic engine. In order to prevent these excessively high boost pressures, blow-off valves, referred to as waste gates, are used both on the air side and on the exhaust side. With the exception of gas engines of pre-mix design, the waste-gate mass flow passed through such a waste gate is usually returned to the exhaust system directly after the turbocharger turbine outlet. Owing to the fact that the waste-gate mass flow is not used for pressure-charging the engine, there is a worsening of the fuel consumption of the engine.

Due to the structural design of the recirculation of the waste-gate mass flow into the exhaust system, whether through the embodiment of the connection itself or through the sudden widening of the outlet duct, even in an embodiment with a guided flow of the exhaust mass flow, a disturbance of the outflow from the turbocharger turbine occurs. This disturbance impairs the operating behavior of the turbine. This impairment can be either mechanical in the form of vibration excitation of the turbine blades or in the form of efficiency losses. These effects are particularly negative, especially in the case of applications with a gas outlet housing designed as a diffusor.

BRIEF DESCRIPTION

Embodiments of the present disclosure provide an exhaust turbine which has a diffusor and which is improved over the exhaust turbines known from the prior art.

To achieve the abovementioned object, an exhaust turbine as claimed in independent claim 1 is provided. Further aspects, advantages and features of the present disclosure can be found in the dependent patent claims, the description and the accompanying figures.

Embodiments of the present disclosure include an exhaust turbine which has a turbine wheel having a plurality of rotor blades and an exhaust outlet duct. The exhaust outlet duct is arranged downstream of the rotor blades of the turbine wheel. The exhaust outlet duct is delimited radially on the outside by an axial turbine diffusor. An exhaust mass flow can be discharged in an axial direction of flow through the exhaust outlet duct. The axial turbine diffusor opens downstream, radially outward, at a non-constant diffusor opening angle, in such a way that a first diffusor opening angle deviates from a second diffusor opening angle by at least 1°. Furthermore, the exhaust turbine includes a waste gate duct, through which a waste-gate mass flow can be injected into the exhaust mass flow. The waste gate duct is designed to generate a substantially axial direction of flow of the waste-gate mass flow at the outlet region of the waste gate duct. The outlet region of the waste gate duct opens into the diffusor or directly downstream into the exhaust outlet duct.

The turbine diffusor has a first diffusor portion having an increasing diffusor opening angle and a second diffusor portion, located downstream of the first diffusor portion, having a decreasing diffusor opening angle. In a transition region between the turbine diffusor and the radial inner wall of the waste gate duct, there is a transition angle which is less than 5°. The substantially axial direction of flow of the waste-gate mass flow is to be understood in such a way that a deviation from the axial direction of flow is less than 5°.

According to an embodiment, the waste-gate mass flow is injected into the exhaust mass flow along the circumference of the waste gate duct concentrically with respect to an axis of rotation of the turbine wheel or in segments concentrically with respect to the axis of rotation of the turbine wheel or through bores in the turbine diffusor which are provided at a distance from one another along the circumference of the waste gate duct.

According to an embodiment, the downstream, radially outer end region of the turbine diffusor extends concentrically to the axis of rotation of the turbine wheel.

According to an embodiment, the downstream, radially outer end region of the turbine diffusor forms a radially inner end region of the waste gate duct.

According to an embodiment, the radially outer end region of the waste gate duct projects beyond the radially inner end region of the waste gate duct in the downstream direction.

According to an embodiment, the axial turbine diffusor has a number N>1 of successive conical diffusor segments.

According to an embodiment, the exhaust outlet duct is partially delimited radially on the inside by a spinner.

According to an embodiment, the spinner is designed as an integral component of the turbine wheel.

According to an embodiment, the spinner is shrunk or screwed or pressed or cinched as a separate component onto the turbine wheel hub.

According to an embodiment, the spinner has a number P≥1 of successive conical spinner segments.

According to an embodiment, the transition region between the turbine diffusor and the radial inner wall of the waste gate duct is of rounded design.

According to an embodiment, the axial turbine diffusor opens downstream, radially outward, at a non-constant diffusor opening angle, in such a way that the outer casing of the turbine diffusor has an S-shaped profile in the axial direction or an S-shaped profile formed from segments. The turbine diffusor has namely a first diffusor portion having an increasing diffusor opening angle and a second diffusor portion, located downstream of the first diffusor portion, having a decreasing diffusor opening angle. This makes it possible for the gas passing through the diffusor to be expanded over a short distance and thus for a high degree of expansion to be achieved with a short overall length. At the same time, an outflow which is laminar and is therefore subject to little hindrance is made possible. According to an embodiment, there may or may not be flow through the waste gate duct.

According to an embodiment, an exhaust turbocharger has an exhaust turbine provided with the features according to the disclosure.

Owing to the fact that the outlet region of the waste gate duct opens into the diffusor or directly downstream into the exhaust outlet duct, the outlet region of the waste gate duct is arranged in the region of the diffusor or directly downstream adjacent to the diffusor. The entry of the exhaust gas from the waste gate duct thus takes place at a point at which the gas flow is at least partially expanded and at the same time is still substantially laminar. At the same time, a compact arrangement is made possible.

Owing to the fact that in a transition region between the turbine diffusor and the radial inner wall of the waste gate duct there is a transition angle of less than 5°, it is possible for an outflow which is substantially laminar and therefore subject to little hindrance to be largely maintained even when exhaust gas flows in from the waste gate duct.

In this way, an exhaust turbine is advantageously provided in which, by means of a special configuration of the feed of the waste-gate mass flow downstream of the turbine, it is ensured that unhindered outflow of the exhaust mass flow through the turbine can take place. A negative reaction in the form of turbine blade vibrations is ruled out by the fact that no hindrance of the outflow can occur. The special configuration claimed has a positive effect on the action of the diffusor. Further advantages of the disclosure are that an exhaust turbine provided with the features according to the disclosure can be constructed in a simple and low-cost manner. Existing components can be modified, if required, with only a small additional outlay. Only a few new elements are required to implement the disclosure.

BRIEF DESCRIPTION OF THE FIGURES

The present disclosure will be explained below with reference to exemplary embodiments, which are shown in the figures and from which further advantages and modifications can be derived.

DETAILED DESCRIPTION

Figure 1:
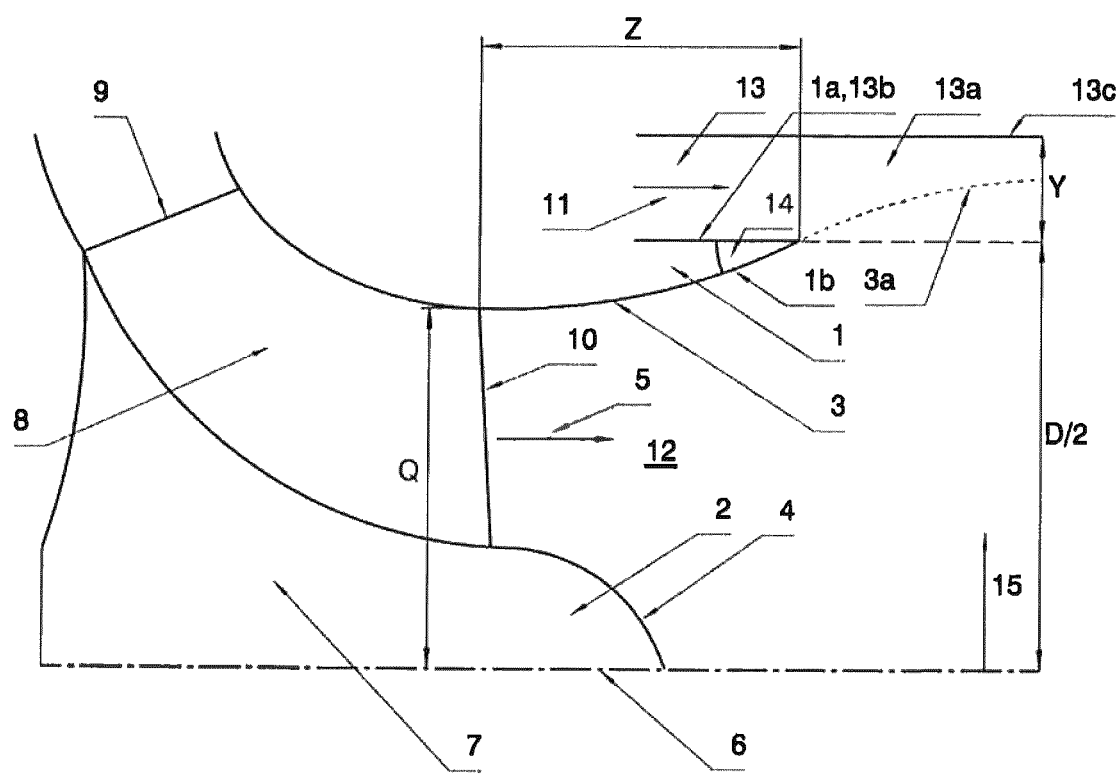
FIG. 1 shows a schematic longitudinal sectional view of a partial region of an exhaust turbine in order to illustrate a first exemplary embodiment of the disclosure.

FIG. 1 shows a schematic longitudinal sectional view of a partial region of an exhaust turbine in order to illustrate a first exemplary embodiment of the present disclosure.

In particular, FIG. 1 shows a turbine wheel 7 with an axial axis of rotation 6, about which the turbine wheel 7 is rotatably mounted. The turbine wheel 7 typically has a multiplicity of rotor blades 8, although only one rotor blade 8 is shown by way of example in the section illustrated in FIG. 1. The diffusor concept described herein can be applied to mixed-flow turbines, radial turbines, and axial turbines, but is not restricted to mixed-flow turbines, radial turbines, and axial turbines.

The rotor blades 8 of the turbine wheel 7 typically include a leading edge 9 and a trailing edge 10. The leading edge 9 of the rotor blades 8 is that edge of the rotor blades to which the exhaust gas flows during operation of the exhaust turbine. The trailing edge 10 of the rotor blades 8 is that edge of the rotor blades from which the exhaust gas flows off during operation of the exhaust turbine. The direction of flow 5 of the exhaust gas is indicated by an arrow in FIG. 1.

As shown by way of example in FIG. 1, the exhaust turbine according to the disclosure includes an exhaust outlet duct 12, which is arranged downstream of the rotor blades 8 of the turbine wheel 7. The exhaust outlet duct 12 is delimited radially on the outside by an axial turbine diffusor 1. Furthermore, the exhaust outlet duct 12 is partially delimited radially on the inside by a spinner 2. According to an embodiment, which can be combined with other embodiments described herein, the axial turbine diffusor 1 is designed to be static, i.e. non-rotating. Furthermore, the spinner 2 can be rotatable. It is also possible to dispense with a spinner.

As illustrated by way of example in FIG. 1, the turbine diffusor 1 opens radially outward at a non-constant diffusor opening angle. In this context, a diffusor opening angle is to be understood to mean the local angle of the diffusor wall relative to the axis of rotation 6. The diffusor contour 3, 3a delimiting the exhaust outlet duct 12 is S-shaped. This makes it possible to combine the exhaust mass flow output by the exhaust turbine with a waste-gas mass flow substantially in parallel, preferably at an angle which is less than 5°. This creates a prerequisite for the waste-gate mass flow to be able to flow in in such a way that separation of the exhaust mass flow is counteracted.

Figure 2:
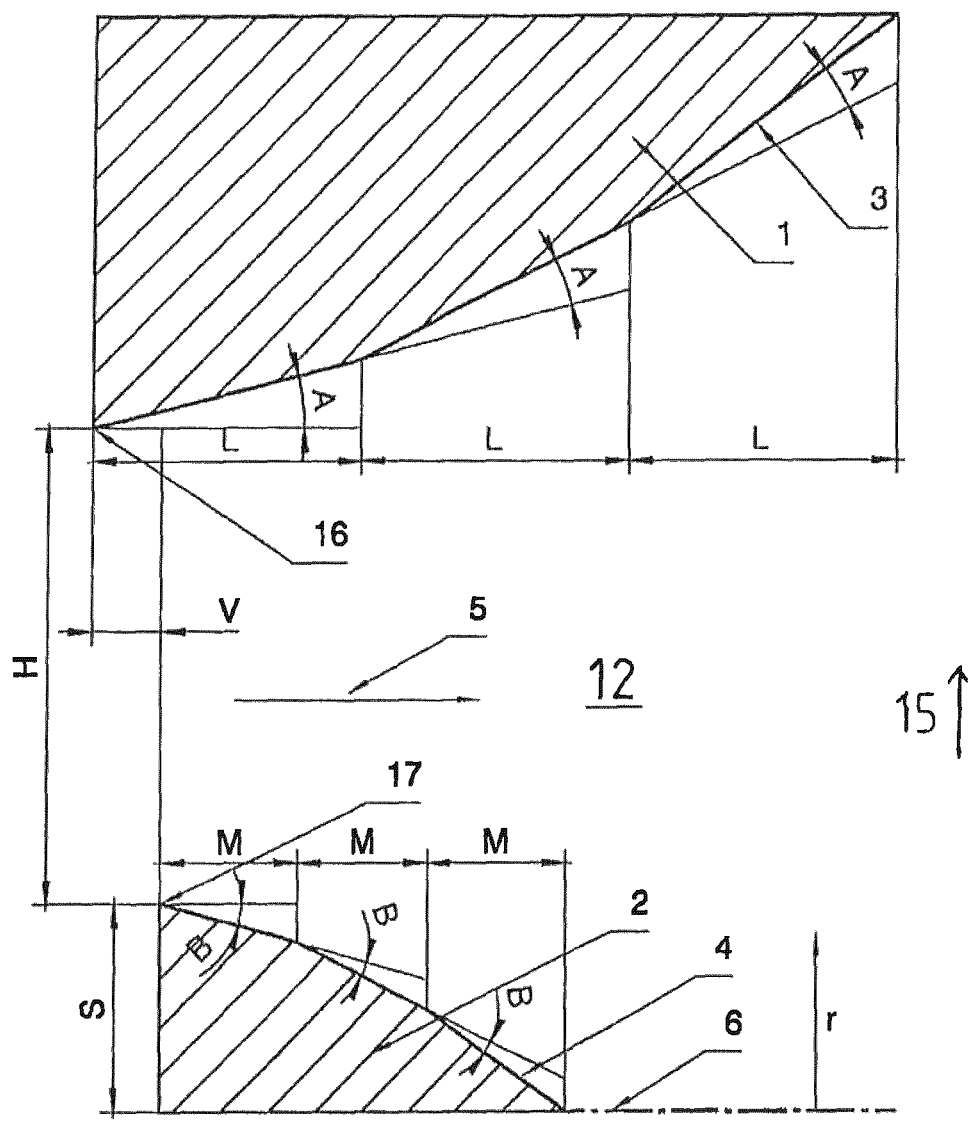
FIG. 2 shows a schematic sectional view of an exhaust outlet duct of an exhaust turbine in order to illustrate a second exemplary embodiment of the disclosure.
Figure 3:
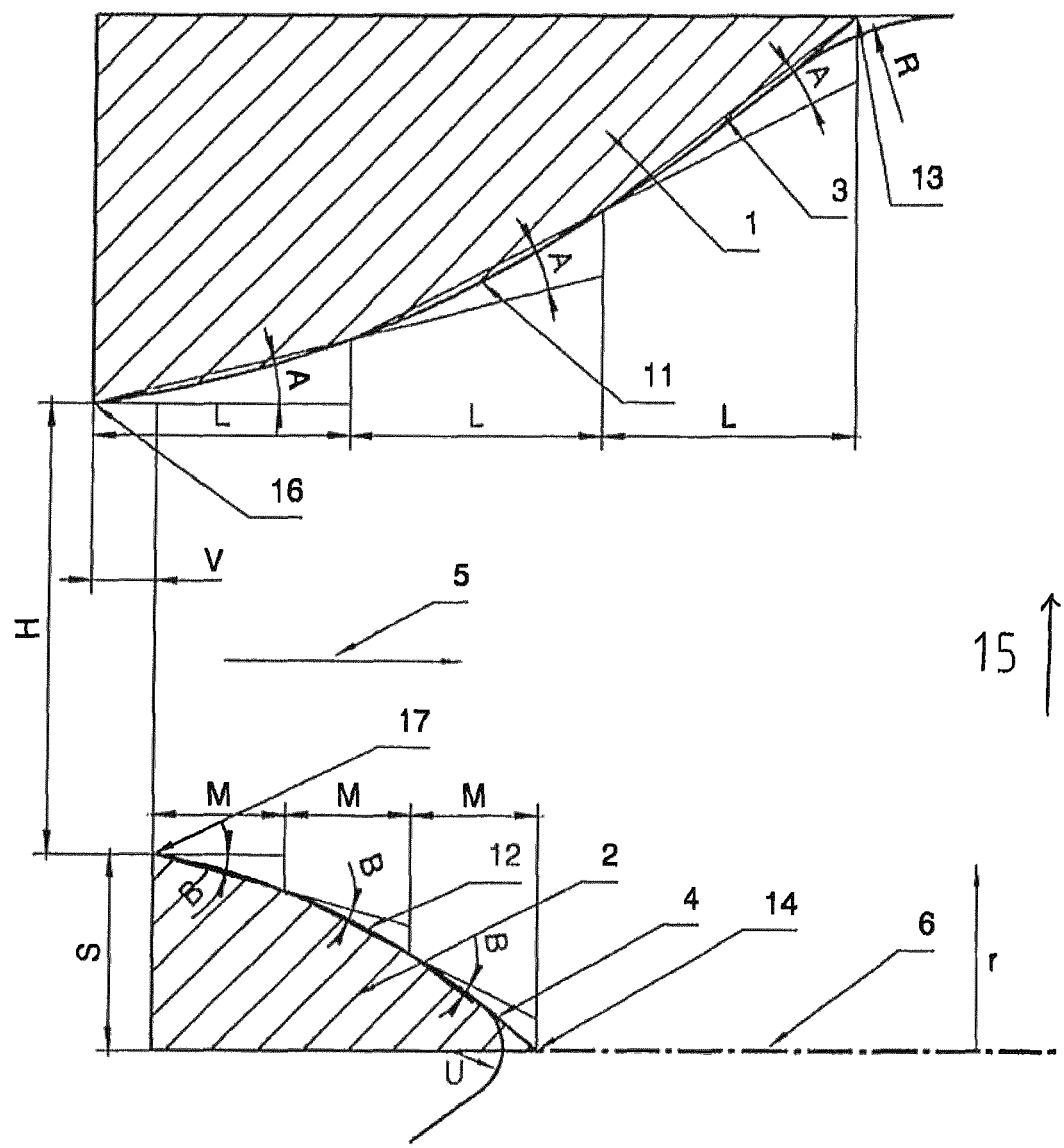
FIG. 3 shows a schematic sectional view of an exhaust outlet duct of an exhaust turbine in order to illustrate a third exemplary embodiment of the disclosure.

As can be seen from FIG. 1, the diffusor contour 3 represents the radially outer boundary of the exhaust outlet duct 12. The spinner 2 includes a spinner contour 4. As is further evident from FIG. 1, the spinner contour 4 represents a radially inner boundary of the exhaust outlet duct 12. In FIGS. 1-3, the radial direction is marked with the reference number 15. "Radially inwardly directed" means directed toward the axis of rotation 6 or axis of symmetry of the exhaust outlet duct. "Radially outwardly directed" means directed away from the axis of rotation 6 or axis of symmetry of the exhaust outlet duct.

According to an embodiment, which can be combined with other embodiments described herein, the spinner 2 can be embodied as an integral component of the turbine wheel 7, as is shown by way of example in FIG. 1. Alternatively, the spinner 2 can, for example, be embodied as a separate component (not explicitly illustrated), which can be connected to the turbine wheel. Accordingly, during operation of the exhaust turbine, the spinner 2 can rotate with the turbine wheel 7. It thus rotates at the same speed of rotation as the turbine wheel. The spinner 2 can extend in the axial direction up to the level of the outlet region 13a of the waste gate duct 13 or even beyond it.

Furthermore, the exhaust turbine illustrated in FIG. 1 has a waste gate duct 13, through which a waste-gate mass flow can be injected into the exhaust mass flow. The outlet region 13a of the waste gate duct 13 is arranged downstream of the turbine diffusor 1. The waste-gate mass flow is injected into the waste-gate mass flow in the axial direction of flow 11, which corresponds to the axial direction of flow 5 of the exhaust mass flow. In addition, the waste-gate mass flow is injected concentrically with respect to the axis of rotation 6 of the turbine wheel 7.

It can also be seen from FIG. 1 that the downstream, radially outer end region 1a of the turbine diffusor 1 extends concentrically with respect to the axis of rotation 6 of the turbine wheel 7. In the case of this concentric injection, the dotted diffusor contour 3a is an imaginary diffusor contour line along which the waste-gate mass flow is injected into the exhaust mass flow.

The downstream, radially outer end region la of the turbine diffusor 1 furthermore forms a radially inner end region 13b of the waste gate duct 13. This radially inner end region 13b of the waste gate duct 13 can extend parallel to the axis of rotation 6. However, its course can also deviate from said parallel course at a small angle of 1°, for example.

Moreover, FIG. 1 illustrates that the radially outer end region 13c of the waste gate duct 13 projects beyond the radially inner end region 13b of the waste gate duct 13 in the downstream direction.

Furthermore, it can be seen from FIG. 1 that the downstream, radially outer end region 1a of the turbine diffusor 1 and thus also the radially inner end region 13b of the waste gate duct 13 enclose a transition angle 14 with the downstream, radially inner end region 1b of the turbine diffusor 1 which is less than 5°. This selection of the transition angle 14 in conjunction with the diffusor contour described allows the waste-gate mass flow to be injected into the exhaust mass flow without turbulence and thus allows the exhaust mass flow to flow off unhindered through the exhaust outlet duct 12.

The transition angle can be defined by the angle between the side walls in the end region (mouth region) 1a of the turbine diffusor 1 and in the end region (mouth region) 1b of the turbine diffusor 1, as shown in FIG. 1.

The following relationship applies to the ratio of the total length Z of the diffusor to the outer radius Q at the turbine rotor outlet:

$$Z/Q<4.$$

Furthermore, the following relationship is advantageous for the ratio of the outside diameter D of the diffusor to the waste gate opening Y at the outlet of the diffusor:

$$0<Y/(D/2)<0.15.$$

An embodiment has been described above in which the waste-gate mass flow is injected into the exhaust mass flow along the entire circumference concentrically with respect to the axis of rotation of the turbine wheel. As an alternative to this, the waste-gate mass flow can also be injected into the exhaust mass flow in segments concentrically with respect to the axis of rotation of the turbine wheel. A further alternative is to perform the injection of the waste-gate mass flow into the exhaust mass flow through bores in the turbine diffusor which are provided at a distance from one another along the circumference of the waste gate duct. The outlet region 13a of the waste gate duct 13 can have a series of holes or slots distributed regularly or irregularly along the circumference or can be an uninterrupted annular duct.

By means of the configuration described above of the feed of the waste-gate mass flow downstream of the turbocharger turbine into the exhaust mass flow, it is ensured that unhindered outflow of the mass flow through the turbine can take place. A negative reaction in the form of turbine blade vibrations is ruled out by the fact that no hindrance of the outflow can occur. The design configuration described has a positive effect both on the action of the diffusor and on the action of the spinner.

It has been described above that the waste-gate mass flow is fed into the exhaust mass flow concentrically with respect to the axis of rotation of the turbine wheel.

According to an embodiment of the disclosure, there may or may not be flow through the waste gate duct. When there is no flow through the waste gate duct, the described concentric feed acts like a downstream stage diffusor, which leads to an increase in turbine efficiency.

The configuration described above of the feed of the waste-gate mass flow to the exhaust mass flow can be implemented in a structurally simple and low-cost manner. Existing components can be modified with a small additional outlay. Only a few new elements are required to implement the embodiments of the disclosure.

In the exemplary embodiment explained with reference to FIG. 1, the diffusor contour 3 and the spinner contour 4 are each of smooth design in the sectional view shown. In the exemplary embodiments explained below with reference to FIGS. 2 and 3, these contours each have a number of successive conical segments.

FIG. 2 shows a schematic sectional view of an exhaust outlet duct 12 in order to illustrate a second exemplary embodiment of the disclosure, only the configuration of the diffusor being illustrated in this illustration.

In particular, FIG. 2 shows an exhaust outlet duct 12 which is arranged downstream of the rotor blades of the turbine wheel. The exhaust outlet duct 12 is delimited radially on the outside by an axial turbine diffusor 1. Furthermore, the exhaust outlet duct 12 is partially delimited radially on the inside by a spinner 2.

As is illustrated by way of example in FIG. 2, the axial turbine diffusor 1 has a number N>1 of successive conical diffusor segments. In FIG. 2, three diffusor segments are illustrated by way of example. In this context, it is pointed out that the embodiment illustrated in FIG. 2 with three diffusor segments is not to be understood as restrictive but that, in principle, any desired number N of diffusor segments greater than or equal to the value 2 can be chosen.

Furthermore, FIG. 2 illustrates axial diffusor opening angles A between the successive diffusor segments. As can be seen from FIG. 2, the axial diffusor opening angle A between the successive diffusor segments is to be understood to mean that angle which results at the transition between adjacent diffusor segments. Typically, an axial diffusor opening angle A between successive diffusor segments has a value of A≥1.0°, in particular A≥2.5°. The value for the axial diffusor opening angle A between adjacent diffusor segments can be constant or have different values. For example, the values of the diffusor opening angle A between successive diffusor segments can increase or even decrease in the direction of flow 5.

As is illustrated by way of example in FIG. 2, the spinner 2 has a number P≥1 of successive conical spinner segments. In FIG. 2, three spinner segments are illustrated by way of example. In this context, it is pointed out that the embodiment illustrated in FIG. 2 with three spinner segments is not to be understood as restrictive but that, in principle, any desired number P of spinner segments greater than or equal to the value 1 can be chosen.

Furthermore, FIG. 2 illustrates axial spinner opening angles B between the successive spinner segments. As can be seen from FIG. 2, the axial spinner opening angle B between the successive spinner segments is to be understood to mean that angle which results at the transition between adjacent spinner segments.

Typically, an axial spinner opening angle B between successive spinner segments has a value of B≥1.0°, in particular B≥2.5°. The value for the axial spinner opening angle B between adjacent spinner segments can be constant or have different values. For example, the values of the spinner opening angle B between successive spinner segments can increase or even decrease in the direction of flow 5.

Furthermore, FIG. 2 shows the axial diffusor segment length L, the inlet height H of the exhaust outlet duct 12, the maximum radius S of the spinner 2 and the axial spinner segment length M. In this context, it is noted that the axial diffusor segment length L is typically constant. Alternatively, the axial diffusor segment length L can increase in the direction of flow 5 or decrease in the direction of flow 5. Likewise, the axial spinner segment length M is typically constant. Alternatively, the axial spinner segment length M can increase in the direction of flow 5 or decrease in the direction of flow 5.

A ratio L/H between the axial diffusor segment length L and the inlet height H of the exhaust outlet duct 15 typically has a value of L/H≥0.01, in particular L/H≥0.05.

A ratio H/S between the inlet height H of the exhaust outlet duct and the maximum radius S of the spinner 2 typically has a value of H/S≥1.0, in particular H/S≥1.3.

A ratio M/H between an axial spinner segment length M and the inlet height H of the exhaust outlet duct 15 typically has a value of M/H≥0.01, in particular M/H≥0.05.

According to an embodiment, which can be combined with other embodiments described herein, the starting point 16 of the diffusor contour 3 can have an axial offset V at the inlet to the exhaust outlet duct, as compared with the starting point 17 of the spinner contour 4, as is illustrated by way of example in FIGS. 2 and 3. The axial offset V of the starting point 16 of the diffusor contour 3 relative to the starting point 17 of the spinner contour 4 can be provided counter to the direction of flow 5, as is illustrated by way of example in FIGS. 2 and 3. Alternatively, the axial offset V of the starting point 16 of the diffusor contour 3 relative to the starting point 17 of the spinner contour 4 can be provided in the direction of flow 5 (not explicitly illustrated). In particular, the offset V can be less than or equal to half the inlet height of the exhaust outlet duct, i.e. V≤H/2.

An exhaust turbine which has an improved diffusor design that permits improved pressure recovery at the exhaust turbine outlet is thus advantageously provided.

In particular, the pressure recovery or the rise in the static pressure downstream of the exhaust turbine is improved by a static (non-rotating) axial diffusor and a rotating spinner at the turbine wheel outlet, both the diffusor contour and the spinner contour being designed in such a way that the outlet region, in particular the exhaust outlet duct, is gradually enlarged, thereby advantageously making it possible to achieve a gradual increase in the static pressure downstream of the exhaust turbine. This has the advantage that the speed of flow at the outlet of the exhaust turbine and the kinetic energy losses can be reduced. In particular, the exhaust turbine according to the disclosure has the advantage that expansion losses of the kind that occur, for example, in the case of the exhaust turbines known from the prior art due to discontinuous and unguided surface changes in the exhaust outlet region can be eliminated and the exhaust flow is normalized. It should furthermore be noted that the reduced outlet flow rates which can be achieved in the exhaust turbine according to the disclosure can also advantageously lead to a reduction in pressure losses in a downstream pipe system.

FIG. 3 shows a schematic sectional view of an exhaust outlet duct 15 of an exhaust turbine according to further embodiments described herein. FIG. 3 also illustrates only the configuration of the diffusor.

In particular, FIG. 3 shows that, according to an embodiment, which can be combined with other embodiments described herein, the successive conical diffusor segments, as a whole, provide a radially outwardly directed diffusor contour 3. As is illustrated by way of example in FIG. 3, the radially outwardly directed diffusor contour 3 can be smoothed by a first spline contour 11. In this way, the pressure recovery or the rise in the static pressure downstream of the exhaust turbine at the turbine wheel outlet can be improved. For example, the first spline contour 11 can be rounded off by a circular contour with a radius R, the radius R being less than or equal to twice the inlet height H of the exhaust outlet duct (R≤2H).

Furthermore, FIG. 3 shows that, according to an embodiment, which can be combined with other embodiments described herein, the successive conical spinner segments provide a radially outwardly directed spinner contour 4. As is illustrated by way of example in FIG. 3, the radially inwardly directed spinner contour 4 can be smoothed by a second spline contour 12. In this way, the pressure recovery or the rise in the static pressure downstream of the exhaust turbine at the turbine wheel outlet can be improved. For example, the second spline contour 12 can be rounded off by a circular contour with a radius U, the radius U being less than or equal to the maximum radius S of the spinner (U≤S).

Furthermore, FIG. 3 shows that, according to an embodiment, which can be combined with other embodiments described herein, an edge 13 of the last diffuser segment arranged in the direction of flow 5 can be rounded off by a circular contour with a radius R. This has an advantageous effect on pressure recovery. Typically, the radius R is less than or equal to twice the inlet height H of the exhaust outlet duct, i.e. R≤2H.

Furthermore, FIG. 3 shows that, according to an embodiment, which can be combined with other embodiments described herein, an edge 14 of the last spinner segment arranged in the direction of flow 5 can be rounded off by a circular contour with a radius U. This has an advantageous effect on pressure recovery. Typically, the radius U is less than or equal to the maximum radius S of the spinner, i.e. U≤S.

By means of the stepwise opening of the diffuser explained with reference to FIGS. 2 and 3, axial compactness of the diffuser is ensured. This axial compactness is of great importance in practice since the space available on the respective engine is limited.

As can be seen from the embodiments described above with reference to FIGS. 1-3, it is advantageous to provide an exhaust turbine which has a diffuser and a waste gate duct and which is improved over the exhaust turbines known from the prior art. In particular, the exhaust turbine according to the disclosure provides an exhaust turbine which has an improved diffuser design that permits improved pressure recovery at the exhaust turbine outlet and, furthermore, permits unhindered outflow of the mass flow through the turbine. A negative reaction in the form of turbine blade vibrations is ruled out by the fact that no hindrance of the outflow can occur. The design configuration described has a positive effect both on the action of the diffuser and on the action of the spinner.

Advantageously, the diffuser of the exhaust turbine according to the disclosure is implemented in such a way that it has a low complexity and installation space size in comparison with exhaust turbine diffusers known from the prior art, and this has a positive effect on the production costs.

Finally, it should be noted that the design of the diffuser and of the optionally provided spinner described herein can be appropriately adapted in respect of the required dimensioning. In other words, the design of the diffuser and the spinner described herein is of general application and can be applied to small, medium and large installation space sizes.

The invention claimed is:

1. An exhaust turbines comprising:
a turbine wheel comprising a plurality of rotor blades;
an exhaust outlet duct arranged downstream of the rotor blades of the turbine wheel, wherein the exhaust outlet duct is delimited radially on an outside by an axial turbine diffuser, wherein an exhaust mass flow can be discharged in an axial direction of flow through the exhaust outlet duct, and wherein the axial turbine diffuser opens downstream, radially outward, at a non-constant diffuser opening angle, in such a way that a first diffuser opening angle deviates from a second diffuser opening angle by at least 1°; and
a waste gate duct, an outlet region of which opens into the axial turbine diffuser or directly downstream of the axial turbine diffuser into the exhaust outlet duct and through which a waste-gate mass flow can be injected into the exhaust mass flow, wherein the waste gate duct is designed to generate a substantially axial direction of flow of the waste-gate mass flow at the outlet region of the waste gate duct, wherein the axial turbine diffuser has a first diffuser portion having an increasing diffuser opening angle and a second diffuser portion, located downstream of the first diffuser portion, having a decreasing diffuser opening angle, and wherein a transition angle in a transition region between the axial turbine diffuser and a radial inner wall of the waste gate duct is less than 5°.

2. The exhaust turbine as claimed in claim 1, in which the waste-gate mass flow is injected into the exhaust mass flow along a circumference of the waste gate duct concentrically with respect to an axis of rotation of the turbine wheel or in segments concentrically with respect to the axis of rotation of the turbine wheel or through bores in the axial turbine diffuser which are provided at a distance from one another along the circumference of the waste gate duct.

3. The exhaust turbine as claimed in claim 1, in which the downstream, radially outer end region of the axial turbine diffuser extends concentrically around an axis of rotation of the turbine wheel.

4. The exhaust turbine as claimed in claim 3, in which the downstream, radially outer end region of the axial turbine diffuser forms a radially inner end region of the waste gate duct or directly adjoins the radially inner end region of the waste gate duct.

5. The exhaust turbine as claimed in claim 4, in which the radially outer end region of the waste gate duct projects beyond the radially inner end region of the waste gate duct in the downstream direction.

6. The exhaust turbine as claimed in claim 1, in which the axial turbine diffuser has a number N>1 of successive conical diffuser segments, or in which the diffuser opening angle is non-constant in a continuously differentiable manner.

7. The exhaust turbine as claimed in claim 1, in which the exhaust outlet duct is partially delimited radially on an inside by a spinner.

8. The exhaust turbine as claimed in claim 7, in which the spinner is designed as an integral component of the turbine wheel or is shrunk or screwed or pressed or cinched as a separate component onto a turbine wheel hub.

9. The exhaust turbine as claimed in claim 1, in which the transition region between the axial turbine diffuser and the radial inner wall of the waste gate duct is of a rounded design.

10. The exhaust turbine as claimed in claim 1, in which the first diffuser opening angle is arranged upstream of the second diffuser opening angle and is greater than the second diffuser opening angle.

11. The exhaust turbine as claimed in claim 10, in which the outlet region of the waste gate duct opens into the second diffusor portion or downstream of the second diffusor portion.

12. The exhaust turbine as claimed in claim 1, in which there may or may not be flow through the waste gate duct.

13. An exhaust turbocharger having the exhaust turbine as claimed in claim 1.

* * * * *

UNITED STATES PATENT AND TRADEMARK OFFICE
CERTIFICATE OF CORRECTION

| | |
|---|---|
| PATENT NO. | : 11,879,389 B2 |
| APPLICATION NO. | : 17/641357 |
| DATED | : January 23, 2024 |
| INVENTOR(S) | : Christoph Mathey and Stephan Senn |

It is certified that error appears in the above-identified patent and that said Letters Patent is hereby corrected as shown below:

On the Title Page

In item (22), in PCT Filed, Line 1, delete "Sep. 9, 2020" and insert therefor -- Sep. 2, 2020 --.

Signed and Sealed this
Nineteenth Day of March, 2024

Katherine Kelly Vidal
*Director of the United States Patent and Trademark Office*